United States Patent Office 3,486,510
Patented Dec. 30, 1969

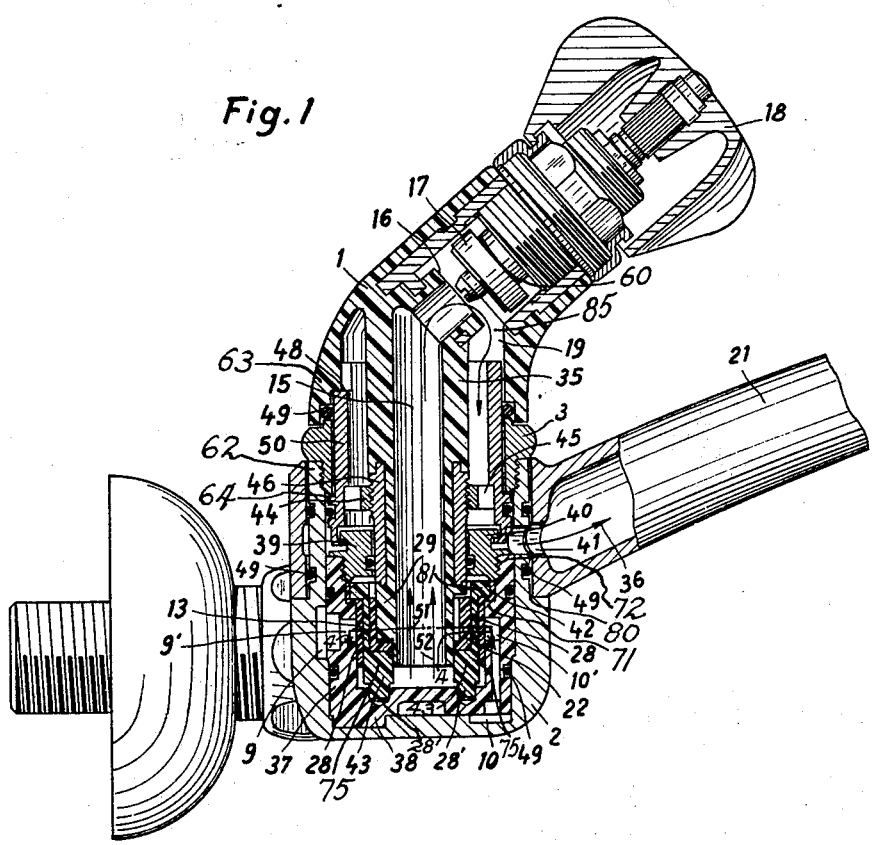

3,486,510
MIXING VALVES, ESPECIALLY WITH ONE GRIP CONTROL
Hans-Heinrich Classen, Lobberich, Rhineland, Germany, assignor to Messrs. Rokal G.m.b.H., Lobberich, Rhineland, Germany
Filed Nov. 22, 1965, Ser. No. 508,937
Claims priority, application Germany, Jan. 16, 1965, R 39,668
Int. Cl. F16k 25/00, 51/00
U.S. Cl. 137—454.5       8 Claims

ABSTRACT OF THE DISCLOSURE

A mixing valve including a valve box having at least two fluid inlets. A removable valve carriage is located in the valve box and has ports in communication with the valve inlets. Means are located within the valve cartridge for controlling the amount of flow that is to be transferred from the valve inlets through the valve ports into the cartridge and to a discharge piece.

My invention relates to a mixing valve, especially operated by one grip only, which is provided with a membranous cylindrical lip overlapping the inlet openings and acting as a return valve, and which is further provided with a flow control valve in which the cylindrical lip may be more or less pressed against one or the other of the two inlet openings for adjustment of the mixing ratio by means of an eccentric or a nose via a guided intermediate member.

Such valve has, for instance, been shown and described by the German patent specification 1,176,943 which corresponds to U.S. Patent No. 3,190,312. In this prior art valve the membranous cylindrical lip, the intermediate member and the insert which is guiding the said intermediate member are forming individual components which will have to be brought in place when the valve is being assembled. Apart from labor costs, certain risks are involved; for it is not sure whether the cylindrical lip is correctly seated. It may happen that the cylindrical lip is pushed together or deformed upon insertion by extreme friction with relation to the interior wall of the valve box which will prevent perfect operation of the valve and necessitate dismounting in order to repeat assembly of the valve in the presence of the same risks. The interior parts can only be removed from the valve box by the aid of special tools involving major difficulties. The same disadvantages exist for cleaning or exchanging of the interior parts.

The prime object of the invention is to eliminate the difficulties outlined above and to provide for a valve which may be assembled more easily and in which the interior parts are combined in a unit which will be assembled prior to insertion into the valve box.

Specifically, according to the invention, the intermediate member, the insert which guides the said member, and the cylindrical lip are housed in a cartridge and protected against twisting, the cartridge having passages for a connection between the inner part of the cartridge and the inlet openings and being inserted into the valve box and being protected against turning.

According to this arrangement, the interior parts are already assembled and ready for insertion prior to their insertion into the valve box and may be tested for correct assembly and perfect operation by means of a suitable testing device prior to insertion into the valve box. Operations relating to assembly, cleaning and replacement of individual parts may be executed on a conventional bench outside of the valve box. Nor are special tools needed any longer.

It is recommendable to produce the cartridge from plastic material. It will be easier for the cylindrical lip to glide into a cartridge which is made from plastics so that any risks for displacement or deformation of the lip will be practically absent.

In order to protect the cartridge against turning, the cartridge may be in a catching connection with the valve box. For this purpose the cartridge may be provided with a projection which is located at the end which is not facing the swing shaft of the valve and the valve box may be provided with a recess which receives the said projection.

Preferably, the cartridge is provided with a ring at the swing shaft side which ring fixes the cylindrical lip and the insert in axial direction and which arrangement will prevent the assembled interior parts from unintentionally disassembling as long as the same are outside of the valve box.

The cartridge may be connected with the swing shaft of the valve in that the ring which fixes the insert and the cylindrical lip in the cartridge, is attached via some kind of bayonet connection, to the projecting end of an interior socket of the swing shaft which socket is in engagement with the valve box. Due to this arrangement it will be possible that the cartridge, together with the interior parts, may be lifted from the valve box upon removal of the swing shaft and may be inserted into the valve box again in reverse order.

The interior socket may be fixed in the hollow swing shaft in such a way that the interior rising channel of the hollow swing shaft is constituted by a tubular interior part of the swing shaft on which a ring has been screwed the ring being provided with passages and pressing the socket into the swing shaft.

The swing shaft and the tubular interior part of the said shaft forming the rising channel of the swing shaft may consist of plastics in which case the tubular interior part is provided with a metal socket which has an exterior thread.

The drawing is an example of a construction according to the invention.

FIG. 1 is a vertical section of a valve.

FIG. 2 is a partial and sectional view of the fixing socket for the atatchment of the cartridge containing the interior parts.

FIG. 3 is an elevation of the cartridge.

FIG. 4 is a view along lines 4—4 of FIG. 1.

The embodiment of the present invention can be used to selectively mix any two fluids and may be used in a sink to mix hot and cold water.

Referring now to the drawings, and in particular to FIG. 1, where a mixing valve in accordance with the present invention is seen to include a valve box 2 and a swinging shaft 1, the latter preferably made from a plastic material. Valve box 2 is seen to be a generally cylindrical U shaped member being threaded internally at its uppermost portion by threads 62. Swinging shaft 1 is seen to include an interior tubular part 35 which defines a channel 15 and at its lowermost portion an eccentric 29. A valve seat 16 is formed at the top of the channel. A valve member 17 is fixed to a spindle 60 and may be moved closer to valve seat 16 than is seen in FIG. 1 by appropriately turning grip button 18 when it is desired to limit the flow that can exhaust from channel 15. Similarly, when it is desired to increase the amount of flow that can exhaust from channel 15 valve member 17 is moved away from valve seat 16 by rotating grip member 18 in the opposite direction than the grip is rotated when it is desired to move valve member 17 closer to valve seat 16. An exteriorly threaded circular metal socket 46 is attached to the outside circumference of tubular part 35.

A second circular socket member 50 is pressed into portion 63 of shaft 1. Socket member 50 is provided at its uppermost portion (FIG. 2) with indents 47 which receive projections 48 of shaft 1 to prevent socket 50 from rotating relative to the shaft. A screw ring 44 is screwed to the threads of socket 46 and has a portion which presses against the inside periphery of socket 50 to force socket 50 against portion 63 of shaft 1 to hold socket 50 attached to shaft 1. Similarly ring 44 defines passage 45 which leads to a discharge piece 21.

Valve box 2 at portion 80 has a shoulder about which discharge piece 21 is supported. A screw ring 3 mates with threads 62 of valve box 2 and has a portion just above flange 64 of socket 50 to hold socket 50 and shaft 1 which is attached thereto in close proximity to valve box 2.

Fluid may enter valve box 2 through chamber (not shown) which lead to fluid inlets 9 and 10. If the present invention is used in a sink to mix hot and cold water, the hot water may be communicated to fluid inlet 9 with the cold water communicated to fluid inlet 10.

A cartridge 37, preferably made of plastic, is inserted in the interior of valve box 2 and is exterior of tubular part 35. The bottom of cartridge 37 has a projection 38 which cooperates with an indent in the base of valve box 2 to prevent the cartridge from rotating relative to the valve box. Cartridge 37 has ports 9' and 10' which communicate with inlets 9 and 10, respectively. Ports 9' and 10' have been shifted 90° in FIG. 1 of the drawings and are shown in their non-shifted position in FIG. 4 of the drawings. This showing of the ports is believed to better described the invention. Adjacent each of the ports and controlling communication between said ports and channel 15 is a cylindrical lip 13 (FIGS. 1 and 4) which is preferably made of an elastic material. Webs 28 of elastic inserts 43 hold cylindrical lip 13 adjacent ports 9' and 10' and prevent the lip from deforming. The upper portion 42 of lip 13 is held adjacent a shoulder 71 of cartridge 37 by upper portion 81 of insert 43 to prevent lip 13 from rotating relative to the cartridge. The upper portion 72 of cartridge 37 is internally threaded as can be seen in FIG. 1. Webs 28 and the bottom part of inserts 43 form shoulders 75 which support intermediate member 22. Member 22 is a cylindrical member with a bottom lip and an opening in its center which surrounds eccentric 29. Part 28' of inserts 43 is received with bottom of cartridge 37 to prevent the insert from turning relative to the cartridge.

An externally threaded ring 39 is screwed to threaded portion 72 of cartridge 37. Ring 39 has a shelf 40 (FIG. 2) which, after proper rotation of cartridge 37, is releasably attached to bayonet mount 41 of socket 50.

When it is desired to remove cartridge 37 from valve box 2 all that need be done is unscrew ring 3 and remove shaft 1 from valve box 2. As cartridge 37 is attached to socket 50 which is attached to shaft 1 the cartridge will also be removed from valve box 2. To remove cartridge 37 from socket 50 all that is necessary is to rotate cartridge 37 so ring 40 is no longer held fast to bayonet mount 41.

To vary the ratio of fluid from inlets 9 and 10 to discharge piece 21 shaft 1 is rotated. This will rotate eccentric 29 (FIGS. 2 and 4) which will press the portions of member 22, web 28 and lip 13 adjacent one cartridge port against that port while holding the portion of member 22, web 28 and lip 13 adjacent the other port loosely against that port. Thus, with a part of lip 13 pressed against one port little fluid from the adjacent inlet will be able to pass to channel 15 while the converse will hold true for the other inlet. Fluid from both ports will pass to channel 15 through area 19 to passage 45, as indicated by arrow 85, and to discharge piece 21, as indicated by arrow 36.

I claim:
1. A mixing valve comprising:
   a valve box, a first fluid inlet located in said valve box, a second fluid inlet located in said valve box, a discharge piece, a rotatable shaft, a cartridge housed within said valve box, said cartridge removable as a unit from said valve box, and means within said cartridge controlled by rotation of said shaft for controlling communication from each of said inlets to said discharge piece.

2. A mixing valve in accordance with claim 1 wherein means are provided for preventing said cartridge from rotating relative to said valve box.

3. A mixing valve in accordance with claim 1 wherein the communication from each of said inlets to said discharge piece is through a channel within said rotatable shaft and through ports located on the periphery of said cartridges which communicate said inlets and said channel.

4. A mixing valve in accordance with claim 3 wherein a tubular part extends from said shaft to the interior of said cartridge to define said channel.

5. A mixing valve in accordance with claim 4 wherein a member extending into said valve box is attached to said shaft and said cartridge is releasibly attached within said valve box to said member.

6. A mixing valve in accordance with claim 5 wherein said member is a socket attached to said shaft, a second socket attached to said tubular part, said second socket within a portion of said first socket, and means attaching said first socket to said second socket.

7. A mixing valve in accordance with claim 6 wherein said first socket has a shelf at its bottom and a ring is located at the top of said cartridge which is releasably attached to said shelf.

8. A mixing valve in accordance with claim 4 wherein the bottom portion of said tubular part is eccentric in shape, an annular intermediate member adjacent said eccentric portion of said tubular part, an annular insert adjacent said intermediate member, a cylindrical lip adjacent said insert and overlapping said ports in said cartridge and means for preventing said cylindrical lip from rotating relative to said cartridge.

References Cited

UNITED STATES PATENTS

| 2,961,006 | 11/1960 | Musser | 251—257 X |
| 3,190,312 | 6/1965 | Classen et al. | 251—331 X |
| 3,195,573 | 7/1965 | Daumy | 251—257 X |

HENRY T. KLINKSIEK, Primary Examiner

U.S. Cl. X.R.

137—625.4; 251—257